US005466947A

United States Patent [19]

Fleig et al.

[11] Patent Number: 5,466,947

[45] Date of Patent: Nov. 14, 1995

[54] PROTECTIVE OVERLAYER FOR PHOSPHOR IMAGING SCREEN

[75] Inventors: Gordon E. Fleig, Oakland; Donald E. Gueffroy, Davis, both of Calif.

[73] Assignee: Bio-Rad Laboratories, Inc., Hercules, Calif.

[21] Appl. No.: 215,127

[22] Filed: Mar. 18, 1994

[51] Int. Cl.[6] .................... G03B 42/00

[52] U.S. Cl. .................... 250/582; 250/484.4; 250/583

[58] Field of Search .................... 250/583, 582, 250/484.4

[56] References Cited

U.S. PATENT DOCUMENTS

| | | | |
|---|---|---|---|
| 3,246,627 | 4/1966 | Loeb et al. | 118/726 |
| 3,301,707 | 1/1967 | Loeb et al. | 428/220 |
| 3,600,216 | 8/1971 | Stewart | 428/417 |
| 3,749,601 | 7/1973 | Tittle | 428/76 |
| 4,123,308 | 10/1978 | Nowlin et al. | 427/536 |
| 4,225,647 | 9/1980 | Parent | 428/336 |
| 4,735,877 | 4/1988 | Kato et al. | 430/5 |
| 4,865,967 | 9/1989 | Shiraishi et al. | 435/6 |
| 4,950,365 | 8/1990 | Evans | 205/198 |
| 5,028,793 | 7/1991 | Lindmayer et al. | 250/484.4 |
| 5,139,813 | 8/1992 | Yira et al. | 427/8 |

FOREIGN PATENT DOCUMENTS

| | | |
|---|---|---|
| 0262676 | 4/1988 | European Pat. Off. . |

OTHER PUBLICATIONS

Harrington, M. G. et al., "Simultaneous Analysis of Phosphoproteins and Total Cellular Proteins from PC12 Cells", *Methods: A Companion to Methods in Enzymology,* 3(2):135–141, (1991).

Capps, G. G., et al., "A Double–Labeling Method for Measuring Induction of Protein Phosphorylation", *Bio Techniques* Research Report, 8(1) (1990).

Mateo, N. B., "Using Gas Plasma to Reengineer Surfaces", *Medical Product Manufacturing News,* Special Report, Sep./Oct. 1990.

Author unknown, "What is Gas Plasma?", Metro–Line Industries, Inc. Surface Technology Group publication (1992).

Author unknown, "Parylene Conformal Coatings Specifications and Properties", Specialty Coating Systems, Inc. publication (1992).

*Primary Examiner*—Constantine Hannaher

*Attorney, Agent, or Firm*—Townsend and Townsend and Crew

[57] ABSTRACT

A stimulable phosphor having a plasma-deposited protective coating comprising a substantially continuous, protective coating which conforms substantially to the surface of the stimulable phosphor. In a preferred embodiment, the coating has a thickness of between about 0.10 and about 1.0 μm, and provides a thinner coating having greater sensitivity to radiation emitted from weak radioactive labels than conventional screen protective coatings, but with effective protection from moisture and physical damage.

33 Claims, 4 Drawing Sheets

PROTECTIVE OVERLAYER FOR PHOSPHOR IMAGING SCREEN

This invention lies in the general field of biochemical assays and detection methods, with a focus on methods of labelling species and detecting the labels. In particular, the invention relates to macromolecule detection involving stimulable phosphor detectors and protective coatings for such detectors.

BACKGROUND OF THE INVENTION

A procedure essential to all molecular biology laboratories is the detection and imaging of macromolecules. This is used in protein assays, DNA sequencing, gene mapping, and any number of other experiments and determinations. The most common method used is by tagging or labelling the molecules of interest with a radioactive species, then recording an autoradiographic image of the radioactive emission on x-ray film.

X-ray films have their limitations. The dynamic range of a typical x-ray film is about fifty-fold, which limits the degree to which one can obtain quantitative information from the film. Also, long exposures are generally required to obtain a satisfactory image, due to the limited sensitivity of the film to the β-particle emissions used in most radioactive labels. In addition, variability is potentially introduced in the development of the film, since this requires a number of steps involving unstable solutions.

Recently, electronic methods of emission detection and recording, such as those employing phosphor screens (see, e.g., U.S. Pat. No. 4,684,592 to Matsuda et al., U.S. Pat. No. 4,788,434 to Takahashi et al., and U.S. Pat. No. 4,801,806 to Nakamura et al.), have enjoyed greater use in the detection and imaging of macromolecules and other labeled biological substances. These methods offer several advantages over x-ray film detection and recording methods. First, the data obtained from detecting and imaging emitted radiation may be stored on magnetic or optical media such as computer hard drives, floppy disks and CD ROMs which offer greater ease of storage as they are far less bulky and heavy than x-ray films. Second, electronically stored images may be analyzed and manipulated using computers. Several public domain and commercial software applications currently exist for the manipulation of electronically recorded images. One such public domain program is Image, available from the National Institutes of Health. Using such software, the information contained in the electronically recorded image can be analyzed at a far greater level of detail than the information available in a conventional x-ray film image.

Unfortunately, current phosphor screens suffer from serious drawbacks. One drawback is that phosphors are easily damaged by external factors such as moisture and physical abrasion. Moisture and high humidity are problems as the reaction of water with the phosphor components causes chemical deterioration of the phosphor. Physical abrasion is also a problem as samples frequently cause contamination of the screen surface which then must be cleaned physically in order to remove the contaminant.

Attempts to alleviate these problems have included the use of protective coatings on the phosphor screen. Typical of such coatings are those described in U.S. Pat. No. 4,684,592. which describes a polymer coating applied with solvent which is dried to leave a 10 μm protective coating on the screen. Other coatings have been made as thin as 7.5 μm. Mylar covered protective screens have also been used.

Typically mylar as thin as 0.5 mils is applied to the phosphor screen with an adhesive having a thickness of approximately 1.0 mils. Unfortunately, these coatings are far too thick to allow sensitive detection of weakly emitting labels such as $^{14}C$ and $^{3}H$. Current mylar screens having 0.6 to 1.0 mils of adhesive can decrease $^{3}H$ sensitivity by 21,000- to 730,000-fold and $^{14}C$ sensitivity by 3.3- to 5.0-fold.

Another problem is that present coating techniques do not compensate for the surface deformities on the phosphor screen, i.e., depressions and elevations, which arise from the highly particulate nature of the phosphor. Generally, coatings are deposited in greater amounts in the depressions of the phosphor screen surface compared with the elevations. The difference in coating depth may vary by as much as 10 to 20 μm using conventional coating processes. Such a wide disparity in coating thickness is unacceptable for imaging radiation from very weak emitters such as $^{3}H$, for which signal attenuation by as much as 50% occurs at a coating thickness of only 1.0 μm, as the regions having less coating thickness will be more sensitive to emissions than regions having greater coating thickness. Thus, the fidelity of imaging weak emitters by current phosphor screens is severely degraded with present coating techniques. Yet, low-energy radioactive labels continue to be attractive in terms of decreased exposure hazards and enabling additional research possibilities. Thus, there is a pressing need to provide a protective coating which protects the phosphor from external damage while allowing maximum sensitivity to low level radiation emitting labels.

SUMMARY OF THE INVENTION

The present invention provides a phosphor imaging screen having high sensitivity to light and weak β radiation comprising, in order: a support; a phosphor layer containing a stimulable phosphor; and a substantially continuous, protective coating which conforms substantially to the surface of the stimulable phosphor.

In a preferred embodiment, the protective coating of the invention comprises an optionally substituted parylene polymer having the structure shown below:

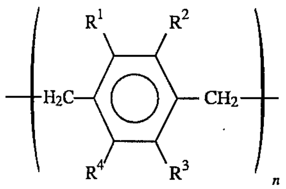

wherein $R^{1-4}$ are selected independently from the group consisting of hydrogen, alkyl, aryl, heteroaryl, alkenyl, cyano, alkoxyl, hydroxyl, aryloxyl, carboxyl, carboxyalkyl, carboxyaryl, halogen, amino, and nitro; and n is at least about 1000.

Preferred coatings are selected from the group consisting of poly(1,4-dimethylbenzene), poly(2-chloro-1,4-dimethylbenzene) and poly(1,5-dichloro-2,4-dimethylbenzene). In one preferred embodiment, the protective coating has a thickness of between about 0.10 and about 50 μm. In another preferred embodiment the coating has a thickness of between about 0.10 and 1 μm.

The present invention also includes a method of recording and reproducing a radiation image comprising the steps of exposing a stimulable phosphor to photons which have passed through the above-described protective coating; exciting the stimulable phosphor with light having a wavelength which is effective to release the radiation energy stored in the stimulable phosphor as light energy; and detecting the light. Preferred coatings are selected from the group consisting of poly(1,4-dimethylbenzene), poly(2-chloro-1,4-dimethylbenzene) and poly(2,5-dichloro-1,4-dimethylbenzene).

The use of the phosphor screen of the invention provides an image with a high degree of sensitivity, contrast and reproducibility with relatively short exposure times. Further advantages of the invention include the ability to detect weak energy emitting substances such as $^{14}C$ and $^{3}H$. These substances are preferable to stronger radiation emitting substances both in terms of worker safety and the ability to use electronic imaging methods in biomedical research and medical applications.

Other features, advantages and preferred embodiments of the invention will be apparent from the description which follows.

DETAILED DESCRIPTION OF THE INVENTION AND PREFERRED EMBODIMENTS

Figure 1:
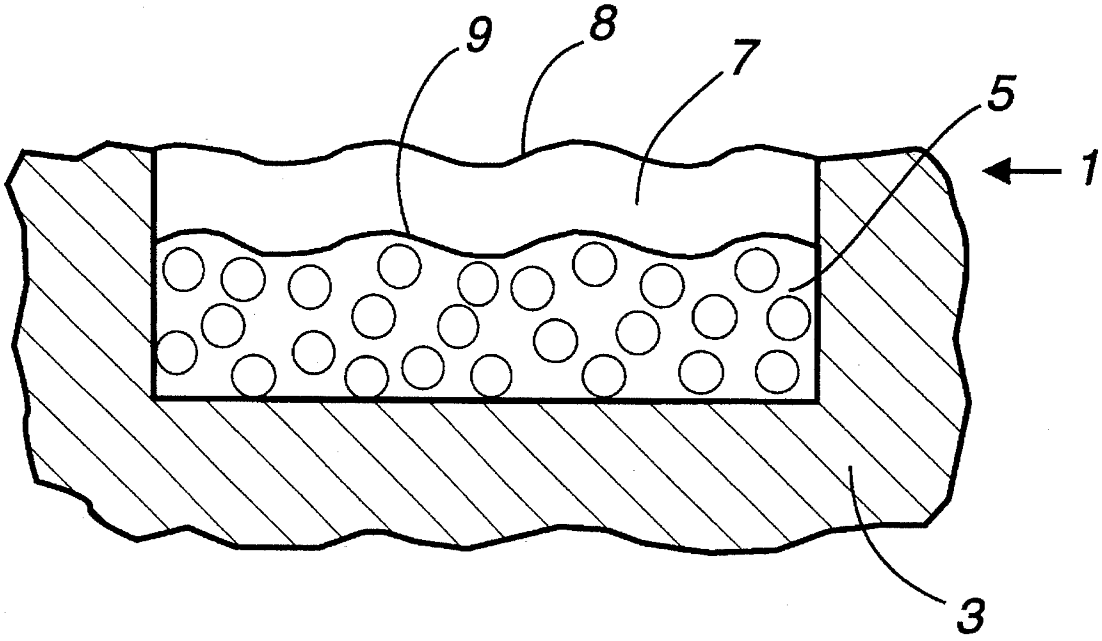
FIG. 1 is a representation of a phosphor screen constructed in accordance with the present invention, including a stimulable phosphor and a protective coating.

FIG. 1 is a representation of a phosphor imaging screen 1 constructed in accordance with the present invention. The imaging screen includes a support 3, a stimulable phosphor 5 and a substantially continuous, conformal protective coating 7. As shown in figure, the stimulable phosphor rests atop the support, and the protective coating rests upon the stimulable phosphor, protecting the phosphor from external physical and chemical insults. The support and stimulable phosphor are of the type and configuration commonly known in the art such as described in U.S. Pat. Nos. 4,684,592, 4,788,434 and 4,801,806; which are incorporated herein by reference, and will be described in greater detail hereinbelow.

The present invention provides a phosphor imaging screen having a substantially continuous, protective coating which conforms substantially to the surface of the stimulable phosphor. By "conforms substantially to the surface of the stimulable phosphor" it is meant herein that the surface of the protective coating of the present invention (shown at 8 in FIG. 1) follows substantially the contours of the surface of the stimulable phosphor (indicated at 9 in FIG. 1). It will be appreciated that the substantial degree of conformity between the surfaces of the stimulable phosphor and the protective coating provides a protective coating which has substantially uniform thickness over the entire surface of the stimulable phosphor; and, therefore, the attenuating effects of the conformal protective coating of the invention will be substantially identical over the entire imaging area to provide thereby greater fidelity of imaging.

The protective coating of the invention may be formed from materials capable of being deposited as a substantially uniform, conformal coating atop the surface of the stimulable phosphor and which do not attenuate significantly weak β radiation. Such materials include polymers or copolymers such as, but are not limited to, e.g., paraxylylene, polyethylene (PE), polytetrafluroethylene (PTFE), silicones, urethanes, epoxides and the like. Also, silicon oxide glasses, such as those described by Brody in *Packing and Technology and Engineering,* 3(1):44–47 (1994), which is incorporated herein by reference, may be deposited as conformal coatings in accordance with the present invention.

In a preferred embodiment, the protective coating comprises a plasma deposited polymer, such as a substituted parylene as shown below, wherein $R^{1-4}$ are selected independently from the group consisting of hydrogen, alkyl, aryl, heteroaryl, alkenyl, cyano, alkoxyl, hydroxyl, aryloxyl, carboxyl, carboxyalkyl, carboxyaryl, halogen, amino, and nitro; and n is at least about 1000. Preferably, the substituents are chosen so to avoid steric hinderance between monomer units and remain inert under process conditions. Preferably, two substituents are hydrogen to avoid steric hinderance.

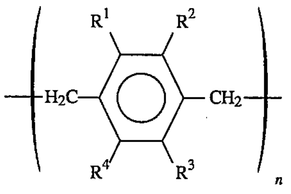

As used herein, "alkyl" refers to substituted or unsubstituted, branched or unbranched carbon chains containing 1–6 carbon atoms, e.g., methyl, ethyl, hexyl, isopropyl, 2-bromobutyl, 3-hydroxy-2-methylpentyl and the like. "Aryl" and "heteroaryl" refer to substituted or unsubstituted carbocyclic or heterocyclic rings which contain at least one aromatic ring system, such as phenyl, naphthyl, nitrophenyl, indolyl, benzofuranyl, thienyl, dibenzofuranyl, 3-methyldibenzothienyl and the like. "Alkenyl" refers to an alkyl group containing at least one double bond. "Cyano" refers to the group —C≡N. "Alkoxyl" refers to the group —OR, where R is alkyl. "Hydroxyl" refers to the group —OH. "Aryloxyl" refers to the group —OAr where Ar is aryl. "Carboxyl" refers to the group —$CO_2$H. "Carboxyalkyl" refers to the group —$CO_2$R where R is alkyl. "Carboxylaryl" refers to the group —$CO_2$Ar where Ar is aryl. "Halogen" refers to the groups F, Br, Cl, and I. "Amino" refers to the group —NR'R" where R' and R" may independently be alkyl or aryl. "Nitro" refers to the group —$NO_2$.

In preferred embodiments, the protective coating comprises a parylene polymer optionally substituted with hydrogen or halogen, and n is about 5000. In more preferred embodiments the substituents are optionally hydrogen or chlorine. More preferred protective coatings are selected from the group consisting of poly(1,4-dimethylbenzene), poly(2-chloro-1,4-dimethylbenzene) and poly(2,5-dichloro-1,4-dimethylbenzene). "Parylene" is the generic name for a thermoplastic film polymer based on paraxylylene, and is available commercially as "Parylene N" (poly(1,4-dimethylbenzene)) from Specialty Coating Systems of Indianapolis, Ind. Mono- and dichloro- substituted parylenes are also available commercially as "Parylene C" (poly(2-chloro-1,4-dimethylbenzene)) and "Parylene D" (poly(2,5-dichloro-1, 4-dimethylbenzene)) from the same supplier.

Figure 2:
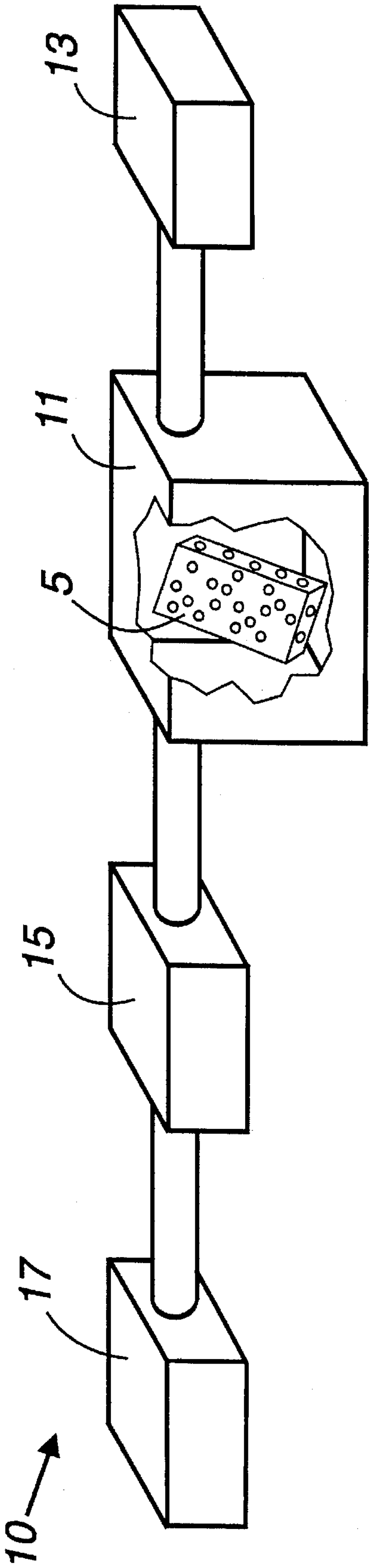
FIG. 2 illustrates a process for applying a protective coating of the invention to a stimulable phosphor.

The parylene polymers are deposited onto the phosphor surface using an apparatus similar to that shown at 10 in FIG. 2, by a plasma coating process well known in the art (see, e.g., U.S. Pat. Nos. 3,246,627 and 3,301,707 to Loeb, et al.; 3,600,216 to Stewart; 3,749,601 to Tittle; 4,950,365 to Evans; and U.S. Pat. No. 4,123,308 to Nowlin, et al., each of which is incorporated herein by reference). Typically, the phosphor to be coated 5 is placed in a deposition chamber 11 of standard construction and materials which is capable of withstanding reduced pressures. The deposition chamber is connected to a vacuum pump 13 and a pyrolysis chamber 15, both of the type commonly used in the deposition of polymer plasmas. The pyrolysis chamber is connected in turn to a vaporizer 17, also of the kind typically used in the deposition of polymer plasmas.

In a typical coating operation, solid paraxylylene dimer is introduced into the vaporizing chamber and vaporized therein at temperatures of about 150° C. and pressures of about 1 Torr (in the case of Parylene N). Upon vaporization, the gaseous dimer is transferred to the pyrolysis chamber where it is heated to about 680° C. at ½ Torr to cause pyrolysis of the dimer bond creating thereby gaseous paraxylylene diradical monomers. The paraxylylene diradical monomers are then passed into the deposition chamber whereupon they condense on the surface of the phosphor, polymerizing upon contact thereon, to form a substantially continuous conformal polymer coating atop the stimulable phosphor. The deposition chamber typically is kept at a temperature of about 25° C. and a pressure of about 0.1 Torr.

Generally, the best results are obtained with a coating thickness within the range of about 0.10 μm to about 50 μm. For applications involving the detection of radiation from strong emitters such as $^{32}P$ and $^{125}I$, the preferred coating thickness is from about 25 μm to about 50 μm, with a thickness of about 35 μm particularly preferred. For applications involving the detection of radiation from weak emitters such as $^{3}H$ and $^{14}C$, the preferred coating thickness is from about 0.1 μm to about 10 μm. A more preferred range for these applications is from about 0.10 μm to about 3 μm, and a still more preferred range is from about 1 μm to about 3 μm, although in some cases, e.g., detecting emission from $^{3}H$, a range of from about 0.10 μm to about 1 μm is the more preferred. The protective coating of the invention provides a substantially continuous protective layer over the stimulable phosphor which conforms substantially to the surface of the phosphor. Preferably the protective coating is substantially uniform, i.e., without pinholes or other gaps in surface coverage, over the surface of the phosphor to be protected.

Any stimulable phosphor may be used in conjunction with the coating of the present invention. The proper selection in each particular application will depend on the label, the phosphors being selected to receive and respond to the emission produced by the particular label.

Phosphors used in the practice of the invention may be selected from the full range of materials known to possess the capability of phosphorescence. In general, these are materials which absorb light and enter an excited state as a result, then undergo relaxation to the ground state while emitting light, either at a different intensity or frequency or over a different time scale, or both. Materials meeting this description include natural minerals, biological compounds and synthetically prepared materials and blends. Examples are metal halophosphates such as $Ca_5(PO_4)_3(F,Cl)$:Sb(III), Mn(II), $Sr_5(PO_4)_3(Cl)$:Eu(II), $Sr_5(PO_4)_3(F,Cl)$:Sb(III), Mn(II) and $[SrEu(II)]_5(PO_4)_3Cl$; other rare-earth-activated phosphors such as $Y_2O_3$:Eu(III), $SrB_4O_7$:Eu(II), $BaMg_2Al_{16}O_{27}$:Eu(II), $Y(VO_4)$:Eu(III), $Y(VO_4)PO_4$:Eu(III), $Sr_2P_2O_7$:Eu(II), $SrMgP_2O_7$:Eu(II), $Sr_3(PO_4)_2$:Eu(II), $Sr_5Si_4Cl_6O_{10}$:Eu(II), $Ba_2MgSi_2O_7$:Eu(II), GdOS:Tb(III), LaOS:Tb(III), LaOBr:Tb(III), LaOBr:Tm(III) and Ba (F, $Cl)_2$: Eu(II); other aluminate-host phosphors such as $Ce0.65Tb_{0.35}MgAl_{11}O_{19}$; silicate-host phosphors such as $Zn_2SiO_4$:Mn(II); and fluoride-host phosphors such as $Y_{0.79}Yb_{0.20}Er_{0.01}F_3$, $La_{0.86}Yb_{0.12}Er_{0.02}F_3$, and $Y_{0.639}Yb_{0.35}$ $Tm_{0.001}F_3$.

Of particular interest are phosphors which remain in the excited state until released by external stimulation. These include many of those listed above, plus others. Preferred examples are alkaline earth metal sulfides and selenides, doped with samarium and europium or cerium oxide, sulfide or fluoride, and further containing a fusable salt such as lithium fluoride, barium sulfate or both serving as a flux. Lists and descriptions of such materials are found in U.S. Pat. No. 4,812,660 (Mar. 14, 1989), U.S. Pat. No. 4,822,520 (Apr. 18, 1989) and U.S. Pat. No. 4,830,875 (May 16, 1989), to Lindmayer, J. (Quantex Corporation), each of which is incorporated herein by reference. The stimulation which releases the energy may be in the form of heat or electromagnetic radiation, such as visible light, x-rays, ultraviolet radiation and infrared radiation, depending on the type of phosphor.

The substrate and phosphors will be selected to emit and absorb, respectively, at the same wavelength, thereby complementing each other in terms of energy emission and response. The energy of a single emission will generally be in the form of a wavelength band, the width of which is not critical in the general sense. In certain applications, as described in more detail below, narrowly defined band widths will serve specific functions. As for the actual wavelengths of the emissions, in most applications within the contemplation of this invention, emissions with peak wavelengths falling within the range of about 350 nm to about 700 nm, preferably from about 400 nm to about 600 nm will be used.

The use of mixed phosphors, together with a corresponding mixture of label/substrate systems, presents further opportunities for enhanced use of the invention. For example, luminol, a common currently available chemiluminescent substrate, emits light at 428 nm when activated, and various naphthyl dioxetane isomers currently available emit light at wavelengths varying from 463 nm to 560 nm. Of the various phosphors available from Quantex Corporation (2 Research Court, Rockville, Md. 20850, USA) the phosphor designated Q-16 will respond to wavelengths of 470 nm but not higher, while the phosphor designated Q-42 will respond to wavelengths up to about 600 nm.

With these phosphors combined on a single screen, or any other combination which can similarly discriminate, one can use multiple label/substrate systems of wavelengths corresponding to those to which the phosphors are receptive. The labels may be selectively placed on distinct preselected groups of macromolecules, and the substrates may be combined in a single substrate mixture.

Since the phosphors will themselves emit light at distinct wavelengths, discrimination in the read-out process may be achieved in a variety of ways, depending on the particular read-out process used. Using infrared detection for read-out, for example, a photomultiplier tube can discriminate between the Q-16 light emissions, which are green, and the Q-42 light emissions, which are orange, through the use of filters.

The use of mixed phosphors in these and other combination systems permits an unlimited variety of comparisons and discriminations. For example, one can discriminate between distinct groups of macromolecules in a single sample or compare against an internal standard. Other possibilities will be readily apparent to those skilled in the art.

The label may be any radiation emitting substance. Typically, such radiation will be in the form of radioactivity, but the radiation may also take the form of light. Preferred radioactive labels include $^3H$, $^{14}C$, $^{32}P$, $^{33}P$, $^{35}S$ and $^{125}I$. Most preferred radioactive labels are those which are weak β emitting substances such as the $^3H$ and $^{14}C$. These radioactive labels are available commercially and can be handled and incorporated into, or attached to, samples using methods well known in the art.

The label may also comprise any materials tending to produce a chemiluminescent emission upon contact with a substrate, including the wide variety of species known in the chemiluminescence art. The label and the substrate may, for example, be reactants which combine to form an excited state which spontaneously degenerates to the ground state with the release of a fluorescent or phosphorescent emission, or reactants which combine to form an intermediate which decomposes spontaneously to an excited state which then undergoes the same conversion and energy release. Alternatively, the reaction may be entirely contained in the substrate. The substrate in such a reaction may be a single species and the reaction either a conversion or decomposition entailing an emission, or the substrate may be a mixture of species which enter into a reaction which results in the emission.

The method of the invention may serve as either a detection method, a quantitation method or both. It may be utilized in assays or other determinations in a variety of configurations and arrangements, which will be readily apparent to those skilled in the art. In general, the invention is applicable to any procedure for detecting or quantifying an immobilized macromolecule or portion of a macromolecule. It is of particular interest in imaging spatial arrays of macromolecules, since it can be conducted in a manner which provides localized information. Such imaging is of value for spatial arrays generated by a variety of laboratory procedures, including electropherograms, chromatograms, dot blots, and any other arrangement of separated solutes or species.

The term "immobilized" is used in this specification to denote retention of a species in a fixed location on a non-liquid surface or matrix, in a manner by which the species will not become dislodged or unattached upon contact with the liquid-phase chemiluminescent substrate. The non-liquid surface or matrix may be a slab gel such as a polyacrylamide or agarose gel, a blotting membrane such as nitrocellulose or derivatized nylon, or a solid surface such as coated glass or a plastic microtiter plate.

Selective tagging of the macromolecule of interest with the label may be achieved by any of the various means known in the biochemical art. The attachment may be a covalent bond, an affinity-type bond, a hydrophobic interaction, a hybridization-type interaction or any other means of attachment. Selectivity may be inherent in the means of attachment, as in covalent, hydrophobic and hybridization interactions, or it may be the result of immunological-type binding specificity or other specific binding behavior. Preferred interactions are hybridization interactions such as the use of DNA or RNA probes, and specific binding interactions, such as antigen-antibody interactions and avidin-biotin interactions.

In these preferred interactions, the label is a weak β radiation emitting substance attached to an immobilized macromolecule. The latter is thus "tagged" with the label selectively, i.e., to the exclusion of the surface or matrix itself and of the other macromolecules which lack the specific binding characteristics involved in the attraction. The attachment is formed in the conventional manner through a covalent bond.

This invention has utility in a wide range of assays and laboratory procedures. Notable examples are protein assays, antibody assays, screening procedures, dilution studies, DNA sequencing, and gene mapping. It will be appreciated that the increased $^3H$ sensitivity provided by phosphors protected by the coating of the invention will allow an extension of double labelling techniques to triple labelling with the inclusion of $^3H$ (see, e.g., Harrington, et al., *Methods: A Companion to Methods in Enzymology,* 3:125–141 (1989); and Capps, et al., *BioTechniques,* 8(1):62–69 (1990)). Other applications will be readily apparent to those skilled in the art.

Figure 3:
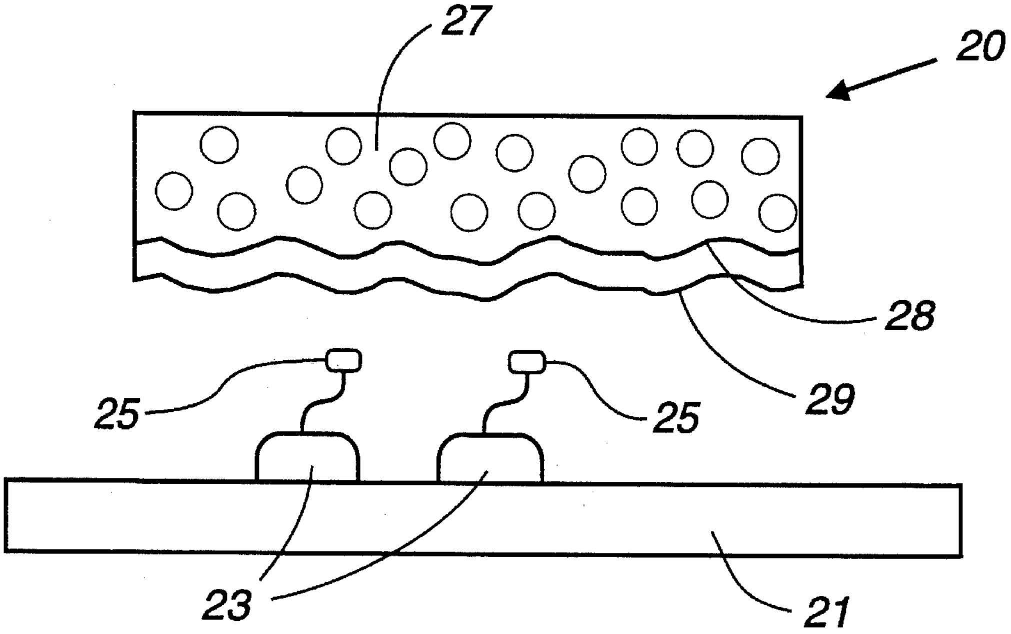
FIG. 3 is an illustration of the detection of signals from a labelled sample.
Figure 4:
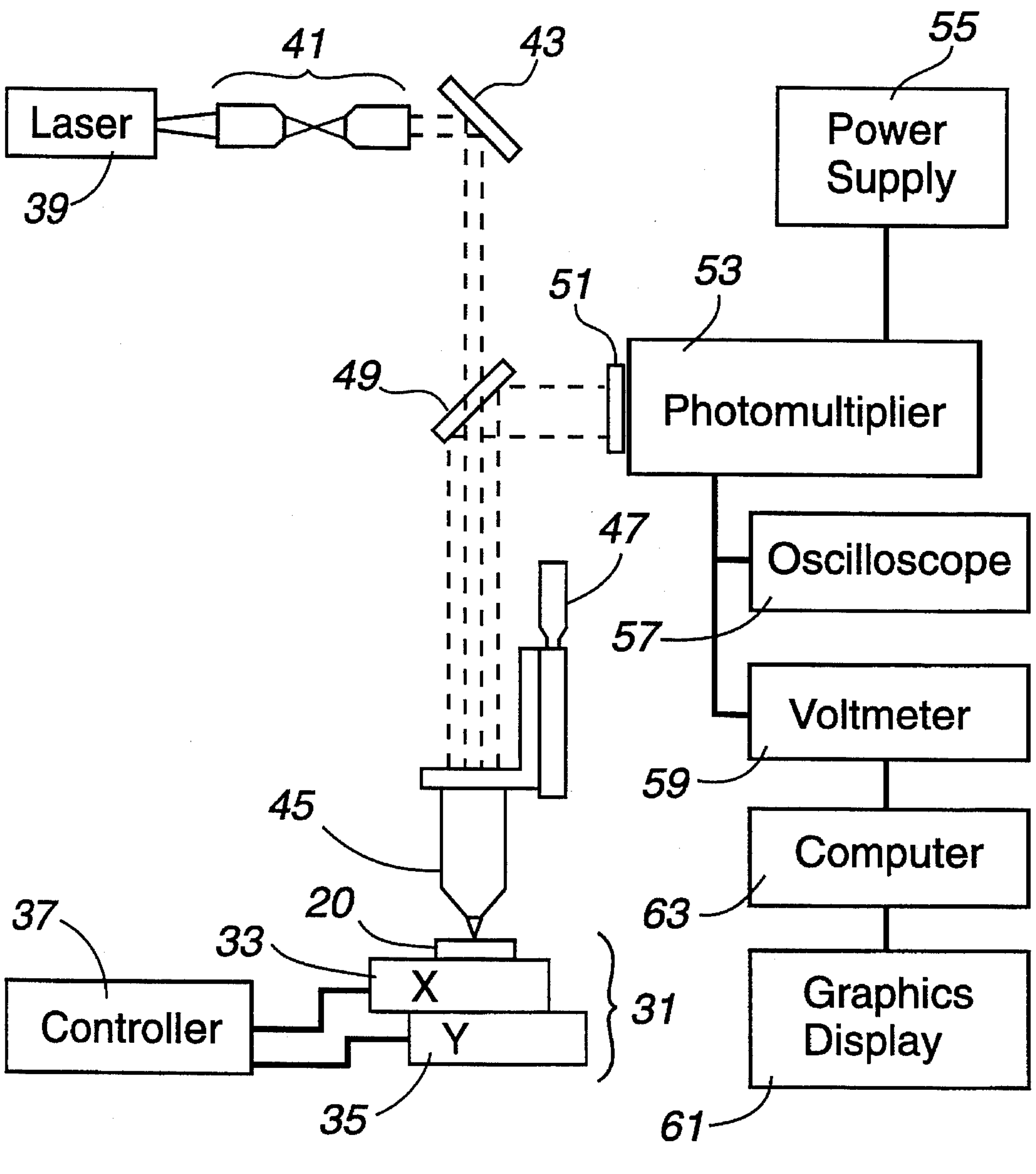
FIG. 4 is a diagram of an arrangement of components for stimulating the receptor material to emit signals corresponding to the emission it has received, and for sensing the signals and converting them to readable form.

Turning again to the drawings, FIG. 3 is a representation of one method of recording emissions on a receptor material, and FIG. 4 is a diagram of an arrangement of components for stimulating the receptor material to emit signals corresponding to the emission it has received, and for sensing the signals and converting them to readable form.

FIG. 3 depicts a support 21 on which macromolecular species 23 are immobilized. As indicated above, this may be a slab gel, a filter membrane, or a solid surface, depending on the type of procedure being conducted. The macromolecular species are localized on the support surface in a distinct planar array, and have been tagged with labels 25. As indicated in the general description above, the labels are preferably weak β emitters such as $^3H$ and $^{14}C$.

A phosphor screen 20, comprising a stimulable phosphor 27 having surface contours 28, protected by a coating 29 which conforms substantially to the phosphor surface, is placed directly above the immobilization pattern on the support, and held in this position for a period of time sufficient to receive sufficient emission to be detectable and yet show the same spatial arrangement as the immobilization pattern on the support. The phosphor in this illustration is one which traps the energy of the emission, and releases it only when stimulated with an external source such as infrared light.

Once the phosphors are sufficiently excited, the screen is removed from the area above the support and placed in the optical arrangement shown in FIG. 4. To permit a full two-dimensional scan of the screen, the screen is placed on a translating apparatus 31 which provides translation along the x- and y-axes. The x-stage translator component 33 and the y-stage translator component 35 of the apparatus are driven by an x-y translator controller 37.

The coated phosphor screen 20 is stimulated by light energy originating from an infrared laser 39 such as, for example, a Nd:YAG laser emitting light at 1064 nm. The beam leaving the laser is collimated through collimating lenses 41 and deflected by a YAG mirror 43. The beam is then focused on the phosphor screen 20 by a lens such as a 20× microscope objective 45 controlled by a z-axis micrometer 47. The translating apparatus 31 causes the beam to scan the entire surface of the screen.

Energy released from the phosphor screen by the infrared stimulation is deflected by a cold mirror 49 through a short pass filter 51 to a photomultiplier tube 53 powered by a high voltage power supply 55. The signal from the photomultiplier tube is directed to an oscilloscope 57 and a high speed digitizing voltmeter 59. The voltmeter reading is translated to a visual form by a graphics display 61 mediated by computer 63. The graphics display 61 permits a full reading and determination of the presence, location and amount of macromolecule immobilized on the support phase 21 of FIG. 3.

All components in this illustration may be supplied by conventional equipment and instrumentation well known and widely used in molecular biology laboratories. It is emphasized once again that this arrangement merely illustrates one method of practicing the invention. Others will readily come to mind to the routineer seeking to adapt the concept to a particular system, environment or available components.

The following example is offered for purposes of illustration. It is intended neither to define nor limit the invention in any manner.

EXAMPLE

Four uncoated phosphor screens were tested for $^{14}C$ sensitivity and resolution, $^{3}H$ sensitivity, and surface abrasion resistance using standard procedures (see, e.g., *Electrophoresis,* 11:355–360 (1990) incorporated herein by reference). These screens were then cleaned using a stream of dry, deionized $N_2$, and coated by plasma depositions of Parylene C at thicknesses of 0.75, 3.95, 9.0, and 28 μm using the above-described plasma coating procedures. After coating, no degradation of the phosphor was observed.

The performance of each coated screen was tested for $^{14}C$ sensitivity and resolution, $^{3}H$ sensitivity, and surface abrasion resistance using standard procedures. Results were compared with the sensitivities before the screens were coated with parylene. The results of this comparison are shown below, and are in accordance with the theoretical attenuation estimates for the indicated thicknesses.

| Screen Number | Parylene Thickness (μm) | Theoretical Attenuation of $^{3}H$ | Theoretical Attenuation of $^{14}C$ | Observed Attenuation of $^{3}H$ | Observed Attenuation of $^{14}C$ |
|---|---|---|---|---|---|
| 1 | 0.75 | ~1.7X | ~1.05X | ~2.0X | ~1.0X |
| 2 | 3.95 | ~15.5X | ~1.2X | — | ~1.0X |
| 3 | 9.0 | ~512X | ~1.5X | ~580X | ~1.4X |
| 4 | 28.0 | ~2.7 × $10^8$X | ~3.0X | NA | ~4.0X |

The 0.75 μm coating showed excellent tritium sensitivity and good mechanical durability, with minimal loss of performance. The parylene-coated screens were cleaned with water without chemical degradation of the phosphor. In contrast uncoated screens cleaned with water showed chemical degradation, producing noticeable amounts of $H_2S$.

Four more screens were coated with Parylene C at thicknesses of 0.44 μm and 1.05 μm and tested for $^{14}C$ sensitivity. These screens demonstrated an approximately 1.5-fold increase in sensitivity to $^{14}C$ and approximately 100-fold increase in sensitivity to $^{3}H$ as compared to screens protected with 8 μm of plastic film, approximately as expected.

The foregoing is offered primarily for purposes of illustration. It will be readily apparent to those skilled in the art that further variations, alternatives, substitutions and the like may be made without departing from the spirit and scope of the invention.

Thus, the present invention is seen to provide a conformal protective coating for phosphor imaging screens which allows for greatly enhanced durability and sensitivity. These protective coatings will enhance the utility and breadth of electronic means for imaging important biochemical and medical data.

What is claimed is:

1. A phosphor imaging screen having high sensitivity to light and weak β radiation, comprising, in order:

(a) a support;

(b) a phosphor layer containing a stimulable phosphor in particulate form forming an uneven surface; and (c) a substantially continuous, protective coating of uniform thickness which conforms substantially to the surface of the stimulable phosphor;

wherein said protective coating comprises an optionally substituted parylene polymer having the structure shown below:

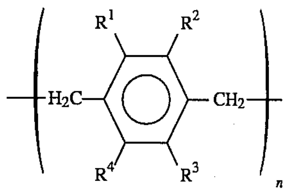

wherein $R^{1-4}$ are selected independently from the group consisting of hydrogen, alkyl, aryl, heteroaryl, alkenyl, cyano, alkoxyl, hydroxyl, aryloxyl, carboxyl, carboxyalkyl, carboxyaryl, halogen, amino, and nitro; and n is at least about 1000.

2. The phosphor imaging screen of claim 1, wherein $R^{1-4}$ are selected independently from the group consisting of hydrogen, hydroxyl, alkyl, carboxyl, carboxylalkyl, cyano, halogen, amino and nitro; and n is at least about 5000.

3. The phosphor imaging screen of claim 2, wherein $R^{1-4}$ are selected independently from the group consisting of hydrogen, hydroxyl, alkyl, amino, cyano, halogen and nitro.

4. The phosphor imaging screen of claim 3, wherein $R^{1-4}$ are selected independently from the group consisting of hydrogen, methyl, ethyl, cyano, halogen and nitro.

5. The phosphor imaging screen of claim 4, wherein $R^{1-4}$ are selected independently from the group consisting of hydrogen, cyano, halogen and nitro.

6. The phosphor imaging screen of claim 5, wherein $R^{1-4}$ are selected independently from the group consisting of hydrogen and halogen.

7. The phosphor imaging screen of claim 6, wherein $R^{1-4}$ are selected independently from the group consisting of hydrogen and chlorine.

8. The phosphor imaging screen of claim 7, wherein said protective coating is selected from the group consisting of poly(1,4-dimethylbenzene), poly(2-chloro- 1,4-dimethylbenzene) and poly(2,5-dichloro-1,4-dimethylbenzene).

9. The phosphor imaging screen of claim 8, wherein said protective coating is poly(1,4-dimethylbenzene).

10. The phosphor imaging screen of claim 8, wherein said protective coating is poly(2-chloro-1,4-dimethylbenzene).

11. The phosphor imaging screen of claim 8, wherein said protective coating is poly(2,5-dichloro-1,4-dimethylbenzene).

12. The phosphor imaging screen of claim 1, wherein said protective coating has a thickness of between about 0.10 and about 50 μm.

13. The phosphor imaging screen of claim 12, wherein said protective coating has a thickness of between about 25 and about 50 μm.

14. The phosphor imaging screen of claim 13, wherein said protective coating has a thickness of about 35 μm.

15. The phosphor imaging screen of claim 12, wherein said protective coating has a thickness of between about 0.10 and about 10 μm.

16. The phosphor imaging screen of claim 15, wherein said protective coating has a thickness of between about 0.10 and about 3 μm.

17. The phosphor imaging screen of claim 16, wherein said protective coating has a thickness of between about 1 and about 3 μm.

18. The phosphor imaging screen of claim 16, wherein said protective coating has a thickness of between about 0.10 and about 1 μm.

19. A method of recording and producing a radiation image, comprising the steps of:

(a) exposing a stimulable phosphor in particulate form forming an uneven surface to photons which have passed through a substantially continuous protective coating of uniform thickness which conforms substantially to the surface of the stimulable phosphor, wherein said protective coating comprises an optionally substituted parylene polymer having the structure shown below:

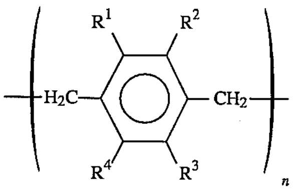

wherein $R^{1-4}$ are selected independently from the group consisting of hydrogen, alkyl, aryl, heteroaryl, alkenyl, cyano, alkoxyl, hydroxyl, aryloxyl, carboxyl, carboxyalkyl, carboxyaryl, halogen, amino, and nitro; and n is at least about 1000;

(b) exciting said stimulable phosphor with light having a wavelength effective to release the radiation energy stored in said stimulable phosphor as light energy; and (c) detecting said emitted light.

20. The method of claim 19, wherein $R^{1-4}$ are selected independently from the group consisting of hydrogen, hydroxyl, alkyl, alkoxyl, carboxyl, carboxylalkyl, cyano, halogen, amino and nitro; and n is at least about 5000.

21. The method of claim 20, wherein $R^{1-4}$ are selected independently from the group consisting of hydrogen, hydroxyl, alkyl, alkoxyl, amino, cyano, halogen and nitro.

22. The method of claim 21, wherein $R^{1-4}$ are selected independently from the group consisting of hydrogen, methyl, ethyl, cyano, halogen and nitro.

23. The method of claim 22, wherein $R^{1-4}$ are selected independently from the group consisting of hydrogen, cyano, halogen and nitro.

24. The method of claim 23, wherein $R^{1-4}$ are selected independently from the group consisting of hydrogen and halogen.

25. The method of claim 24, wherein $R^{1-4}$ are selected independently from the group consisting of hydrogen and chlorine.

26. The method of claim 25, wherein said protective coating is selected from the group consisting of poly(1,4-dimethylbenzene), poly(2-chloro-1,4-dimethylbenzene) and poly(2,5-dichloro-1,4-dimethylbenzene).

27. The method of claim 26, wherein said protective coating is poly(1,4-dimethylbenzene).

28. The method of claim 26, wherein said protective coating is poly(2-chloro-1,4-dimethylbenzene).

29. The method of claim 26, wherein said protective coating is poly(2,5-dichloro-1,4-dimethylbenzene).

30. The method of claim 19, wherein said protective coating has a thickness of between about 0.10 and about 50 μm.

31. The method of claim 30, wherein said protective coating has a thickness of between about 0.10 and about 10 μm.

32. The method of claim 31, wherein said protective coating has a thickness of between about 0.10 and about 3 μm.

33. The method of claim 32, wherein said protective coating has a thickness of between about 0.10 and about 3 μm.

* * * * *